United States Patent Office 3,093,668
Patented June 11, 1963

3,093,668
CYCLOOCTATETRAENE GROUP VIB TETRACARBONYL COMPOUNDS AND PROCESS FOR PREPARING SAME
Kryn G. Ihrman, Farmington, Mich., and Thomas H. Coffield, Heidelberg, Germany, assignors to Ethyl Corporation, New York, N.Y., a corporation of Virginia
No Drawing. Filed Mar. 23, 1960, Ser. No. 16,948
9 Claims. (Cl. 260—429)

This invention relates to novel organometallic compounds and their mode of preparation. More specifically, this invention relates to cyclooctatetraene-metal-tetracarbonyl compounds of the group VIB metals, i.e., molybdenum, chromium and tungsten wherein the metal is bonded to a cyclooctatetraene molecular species and in addition is bonded to four carbonyl groups.

It is an object of this invention to provide a novel class of cyclooctatetraene-metal-tetracarbonyl compounds of chromium, molybdenum and tungsten. A further object is to provide a process for the preparation of these compounds. Additional objects of this invention will become apparent from a reading of the specification and claims which follow.

The objects of this invention are accomplished by providing compounds represented by the following formula $$Q_zM(CO)_4$$

wherein Q is a cyclooctatetraene molecular species, M is a group VIB transition metal, i.e., molybdenum, chromium or tungsten, and z is 1 or 2. In the above formula, the cyclooctatetraene molecular species represented by $Q_z$ where z is one or two donates four electrons to the metal atom, M, for bonding, and each carbonyl group donates two electrons to the metal for bonding. By virtue of the electrons donated to the metal atom, it achieves the electron configuration of the next higher inert gas above the metal atom, M, in the periodic table.

Our compounds are prepared by reacting a cyclooctatetraene compound, denoted in the previous paragraph as $Q_z$, with a carbonyl compound of a group VIB transition metal, i.e., chromium, molybdenum or tungsten. The cyclooctatetraene reactant, Q, has the formula as follows

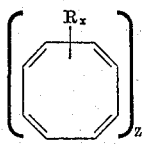

in which R is a monovalent substituent group, x is an integer ranging from zero to eight and z is one or two. The positions on the cyclooctatetraene group, which are not occupied by the monovalent substituent group R, are occupied by hydrogen atoms. Thus, when x is zero, there are eight hydrogens substituted on the cyclooctatetraene ring; this is the parent compound cyclooctatetraene. R, as previously defined, is a monovalent subsstituent group which preferably contains up to about 10 carbon atoms and can be, for example, an alkyl, halogen, alkenyl, cycloalkenyl, or a cycloalkyl radical. Preferably, the total number of carbon atoms present in all of the R substituent groups does not exceed 20 carbon atoms. Most preferably, the R substituent groups are aliphatic or cyclo aliphatic in character.

When z is two, in the preceding formula, it indicates that two cyclooctatetraene molecules have condensed to give a structure which is visualized as having the following formula

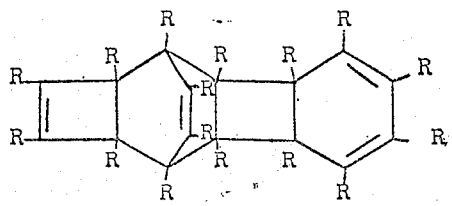

in which R has the meaning previously set forth. When the cyclooctatetraene molecule is cyclooctatetraene itself, this "dimer" has the formula $C_{16}H_{16}$.

The group VIB metal-carbonyl compound employed in forming our compounds in a non-ionic organometallic compound containing at least four carbonyl groups in the molecule which are bonded to the group VIB metal. More preferably, in the metal carbonyl reactant only carbon atoms are bonded to the metal atom in the molecule. Typical of the metal carbonyl reactants which may be employed are the simple metal carbonyls such as chromium hexacarbonyl, molybdenum hexacarbonyl and tungsten hexacarbonyl. Also included are group VIB metal carbonyls in which a cyclic olefin is bonded to a metal tetracarbonyl moiety. Typical of such compounds are cyclooctadiene molybdenum tetracarbonyl, cyclooctadiene chromium tetracarbonyl, bicycloheptadiene molybdenum tetracarbonyl, cyclohexadiene tungsten tetracarbonyl, bicycloheptadiene chromium tetracarbonyl, and the like. The preferred metal carbonyl reactants are the simple metal hexacarbonyls which contain only a metal atom and six carbonyl groups bonded to the group VIB metal atom.

The preferred compounds of our invention are those in which the metal M in the preceding formula is molybdenum. These compounds are preferred since they are, in general, more stable than other of our compounds containing chromium and tungsten.

Typical of the compounds of our invention are cyclooctatetraene molybdenum tetracarbonyl, dicyclooctatetraene molybdenum tetracarbonyl, cyclopropenylcyclooctatetraene tungsten tetracarbonyl, dichlorocyclooctatetraene chromium tetracarbonyl, 1,2,3,4,5-pentabutyl-cyclooctatetraene tungsten tetracarbonyl, 1,2,3,4,5,6,7,8-octamethylcyclooctatetraene chromium tetracarbonyl, bis(2-propenylcyclooctatetraene) molybdenum tetracarbonyl, bis-(cyclobutylcyclooctatetraene) tungsten tetracarbonyl, bis-(trimethylcyclooctatetraene) molybdenum tetracarbonyl, and the like.

The compounds of our invention are produced by the reaction of a cyclooctatetraene compound with a group VIB metal tetracarbonyl compound, both as defined above. In this reaction, the cyclooctatetraene compound displaces ligands such as carbon monoxide, bicycloheptadiene, cyclooctadiene or the like from the metal carbonyl reactant to form our compounds by replacement of the displaced ligand with the cyclooctatetraene compound.

In general, the process may be carried out at temperatures between about 75 to about 200° C. Preferably, however, temperatures in the range from about 100 to about 160° C. are employed since, within this range, relatively higher yields are obtained with a minimum of undesirable side reactions. The pressure under which the process is carried out is not critical. Preferably, however, the process is conducted at atmospheric pressure or slightly higher although pressures up to 500 atmospheres, can be employed if desired.

The process is generally conducted under a blanketing atmosphere of an inert gas such as nitrogen, helium, argon and the like.

The process may be conducted in the presence of a nonreactive solvent. The nature of the solvent is not critical and in fact, the cyclooctatetraene reactant may be used in sufficient excess to serve as a reaction solvent.

Typical of reaction solvents which may be employed in our process are high boiling saturated hydrocarbons such as n-octane, n-decane, and other paraffinic hydrocarbons having up to about 20 carbon atoms such as eicosane, pentadecane, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysiloxanes, hexapropyldisilane, and diethyldipropyldiphenyldisilane may also be employed. Other ester solvents are those derived from succinic, maleic, glutaric, adipic, pimelic, suberic, azelaic, sebacic and pinic acids. Specific examples of such esters are di-(2-ethylhexyl) adipate, di-(2-ethylhexyl) azelate, di-(2-ethylhexyl) sebacate, di-(methylcyclohexyl) adipate and the like. Of these enumerated solvents, those which are preferred for use in the process are the high boiling ethers and saturated aliphatic hydrocarbons. All of the above solvents will not be suitable for all of the specific embodiments of the invention since certain of the metal carbonyl reactants are relatively insoluble in some of the above solvents. Thus, care should be used in selecting the specific solvent for the specific reaction.

The particular solvent employed in any embodiment of the process should be selected from those solvents having the requisite boiling and/or freezing point. Frequently the boiling point of the solvent is used to control the reaction temperature when the process is carried out at atmospheric pressure. In such cases, the reaction mixture is heated at reflux, and the reflux temperature is determined by the boiling point of the solvent. The ease of separating the product from the solvent depends on the degree of difference between the boiling and/or freezing points of the product and the solvent. If the product is a liquid having a boiling point close to that of the solvent, it is obvious that separation will be difficult. In order to avoid this, it is preferable to select a solvent whose normal boiling point varies by at least 25° C. from the normal boiling point of a liquid product. If, on the other hand, the product is a solid, it is desirable that the freezing point of the solvent be at least 25° less than the temperature at which separation of the product is effected through crystallization. Obviously, if the solvent freezes before the solid product precipitates, it will be impossible to make a separation through crystallization.

The above criteria, as to physical properties of the solvent, are not unique to this process. In any chemical process, it is necessary to pick a solvent whose physical properties make it readily separable from the product being formed. It is deemed, therefore, within the skill of the art to select the most suitable solvent for use in any particular embodiment of the process of the invention.

The process is preferably conducted with agitation of the reaction mixture. Although agitation is not critical to the success or failure of the process, its use is preferred since it accomplishes a smooth and even reaction rate.

The time required for the process varies depending on the other reaction variables. In general, a time period from about 30 minutes to about 24 hours is sufficient.

In some cases, the process is advantageously carried out in the presence of an ultraviolet light source. This tends to decrease the reaction time and give a higher yield of product.

In some cases the metal carbonyl reactant employed in the process is more expensive than the cyclooctatetraene reactant. In order to insure maximum conversion of the metal carbonyl, it is, therefore, preferred in those cases to use excess quantities of the cyclooctatetraene. Generally, from about one to about 10 moles of the cyclooctatetraene compound are employed for each mole of the metal carbonyl reactant since, within this range, a good conversion of the metal carbonyl is obtained. In other cases, the cyclooctatetraene is more expensive than the particular metal carbonyl employed. In these instances, excess metal carbonyl reactant (from one to about 10 moles of metal carbonyl per mole of the cyclooctatetraene reactant) is employed to insure complete conversion of the cyclooctatetraene compound.

In some cases, hydroquinone or other free radical reaction inhibitors can be employed in the reaction, if desired, to prevent polymerization of the cyclooctatetraene reactant. Their presence is not critical, however, to the success of the reaction. Typical of other applicable free radical inhibitors are p-tert-butyl catechol, p-hydroxy anisole, 4-amino-1-naphthol, chloranil, 2,4-dinitro-chlorobenzene, dithiocarbamate and the like.

To further illustrate the compounds of the invention and their mode of preparation, there are presented the following examples in which all parts and percentages are by weight unless otherwise indicated.

EXAMPLE I

A mixture comprising 2.6 parts of molybdenum hexacarbonyl, five parts of cyclooctatetraene and about 18 parts of decahydronaphthalene was heated at reflux (160–177° C.) for three hours under nitrogen. The mixture was then filtered to yield 1.5 parts of a dark residue. The filtrate was cooled with Dry Ice and filtered to yield gray, finely divided crystals which were separated from the filtrate and dried. The dark residue was extracted with hot benzene, filtered, and the solvent was removed from the filtrate by heating in vacuo. Additional quantities of the gray, finely divided crystals were obtained from the filtrate. The melting point of the gray crystalline product was 190–192° C. with decomposition. On analysis, there was found: C, 57.4; H, 3.99. Dicyclooctatetraene molybdenum tetracarbonyl $(C_8H_8)_2Mo(CO)_4$, requires: C, 57.7; H, 3.9 percent. The infrared spectrum of the product showed bands at 4.9, 5.16 and 5.3 microns. This spectrum closely resembles that of cyclooctadiene molybdenum tetracarbonyl and bicycloheptadiene molybdenum tetracarbonyl. On the basis of its infrared spectrum and its carbon and hydrogen analysis, the product was clearly identified as dicyclooctatetraene molybdenum tetracarbonyl.

EXAMPLE II

A mixture comprising 10 parts of molybdenum hexacarbonyl and about 41.5 parts of cyclooctatetraene was heated at reflux for 4.5 hours (128–150° C.) under nitrogen. To the reaction product was added about 44 parts of hot benzene. The resulting mixture was filtered, and the filtrate was heated in vacuo to distill off solvent and unreacted starting material. The remaining residue was recrystallized twice from benzene to yield six parts of the gray, finely divided crystalline product, dicyclooctatetraene molybdenum tetracarbonyl, as obtained in Example I.

EXAMPLE III

A mixture comprising 16.6 parts of cyclooctatetraene in about 107 parts of n-nonane was added dropwise to 10 parts of molybdenum hexacarbonyl in about 502 parts of refluxing n-nonane (125° C.). The addition took place under nitrogen over a two hour period. Refluxing was continued for an additional three hours after which the solvent was distilled from the resulting mixture by heating it in vacuo. The residue was sublimed at two mm. Hg and 100° C. to yield a mixture of molybdenum carbonyl and an air-sensitive red crystalline material which was cyclooctatetraene molybdenum tetracarbonyl. The infrared spectrum of the mixture showed metallocarbonyl bands at 4.9, 5.0, 5.17 and 5.23 microns. The band at five microns was due to the presence of molybdenum hexacarbonyl while the other three bands were due to the presence of the cyclooctatetraene molybdenum tetracarbonyl.

EXAMPLE IV

A mixture of 0.05 mole of tungsten hexacarbonyl and 0.2 mole of butylcyclooctatetraene is stirred and heated at reflux in an inert atmosphere for 30 minutes. The reaction mixture is filtered, and solvent is removed from the filtrate by heating in vacuo. The resulting residue is dissolved in low boiling petroleum ether and chromatographed on alumina to yield bis(butylcyclooctatetraene) tungsten tetracarbonyl.

EXAMPLE V

A solution is formed by dissolving 0.1 mole of 1-methylcyclooctatetraene and 0.5 mole of bicycloheptadiene molybdenum tetracarbonyl in diethylene glycol dimethyl ether. The solution is heated at reflux for six hours under nitrogen after which it is filtered, and solvent is removed by heating under vacuum. The residue is dissolved in low-boiling petroleum ether and chromatographed on alumina. The product band is then heated in vacuo to give a good yield of bis(methylcyclooctatetraene) molybdenum tetracarbonyl.

EXAMPLE VI

To a solution of 0.5 mole of chromium hexacarbonyl in n-nonane is added five moles of pentabutylcyclooctatetraene. The mixture is heated at reflux for 10 hours under nitrogen after which the reaction product is discharged from the reaction vessel and filtered. Excess solvent is removed from the filtrate by heating under vacuum, and the residue is dissolved in low-boiling petroleum ether and chromatographed on alumina. The eluate is heated in vacuo to remove the petroleum ether and give a good yield of pentabutylcyclooctatetraene chromium tetracarbonyl.

EXAMPLE VII

Three tenth moles of molybdenum hexacarbonyl and 0.45 mole of tri-tert-butyl-cyclooctatetraene are dissolved in diethyladipate, and the solution is heated at reflux under nitrogen for two hours. The reaction product is then filtered, and solvent is removed from the filtrate by heating in vacuo. The residue is dissolved in low-boiling petroleum ether and chromatographed on alumina. On removing the solvent from the eluate by heating under vacuum, there is obtained tri-tert-butyl-cyclooctatetraene molybdenum tetracarbonyl.

EXAMPLE VIII

A solution is formed by dissolving 0.25 mole of cyclooctadiene molybdenum tetracarbonyl and 0.25 mole of chlorocyclooctatetraene in diethylene glycol dimethyl ether. The solution is heated at reflux for five hours under nitrogen. It is then filtered, and solvent is removed in vacuo. There is obtained from the residue, by means of chromatographic separation as in the previous examples, a good yield of bis (chlorocyclooctatetraene) molybdenum tetracarbonyl.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate and the like.

The compouds of our invention have further utility as additives to residual and distillate fuel generally, e.g., jet fuels, home heater fuels and diesel fuels, to reduce smoke and/or soot formation. Also, they may be employed as additives to lubricating oils in which case they act to improve the lubricity of the base oil.

Our compounds are further useful in many metal plating applications. In order to effect metal plating using the compounds they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of dicyclooctatetraene molybdenum tetracarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility of our compounds is their use as chemical intermediates in the preparation of metal-containing polymeric materials or in the preparation of new organic materials.

Hacing fully defined the novel compounds of our invention, their novel mode of preparation and their many utilities, we desire to be limited only within the lawful scope of the appended claims.

We claim:

1. Organometallic compounds having the formula $$Q_zM(CO)_4$$ 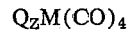

wherein Q is a cyclooctatetraene molecule having up to 20 carbon atoms, and having the formula

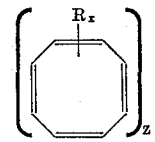

wherein R is an inert monovalent substituent group selected from the class consisting of halogen and univalent hydrocarbon radicals having up to 10 carbon atoms and selected from the class consisting of alkyl, alkenyl, cycloalkyl and cycloalkenyl radicals, $x$ is an integer having a value of zero to eight, $z$ is an integer having a value of one to two, and M is a group VIB metal.

2. The compounds of claim 1 wherein M is molybdenum.

3. Dicyclooctatetraene molybdenum tetracarbonyl.

4. A process for the preparation of the compounds of claim 1 comprising reacting a cyclooctatetraene molecule having up to 20 carbon atoms and having the formula

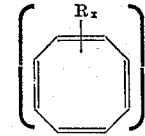

wherein R is an inert monovalent substituent group selected from the class consisting of halogen and univalent hydrocarbon radicals having up to 10 carbon atoms and selected from the class consisting of alkyl, alkenyl, cycloalkenyl and cycloalkenyl radicals, $x$ is an integer having a value of zero to eight, and $z$ is an integer having a value of one to two, with a group VIB metal-containing compound selected from the class consisting of group VIB metal hexacarbonyls and non-ionic organometallic compounds containing a group VIB transition metal atom and at least four carbonyl groups which are bonded to said metal atom.

5. The process of claim 4 in which the reaction is carried out in the presence of a blanketing atmosphere of an inert gas.

6. The process of claim 4 wherein wherein the group VIB metal-containing compound is a group VIB metal hexacarbonyl.

7. The process of claim 6 wherein the group VIB metal-containing compound is molybdenum hexacarbonyl.

8. The process of claim 4 wherein the group VIB metal-containing compound is a non-ionic organometallic compound consisting of a group VIB transition metal atom, a cyclic diolefin, and four carbonyl groups which are bonded to said metal atom.

9. The process of claim 8 wherein the group VIB metal-containing compound contains molybdenum in the molecule.

References Cited in the file of this patent

Manuel et al.: "Proceedings of the Chemical Society (London)," March 1959, page 90.

Rausch et al.: "Chemistry and Industry," July 25, 1959, pages 957—958.

Manuel et al.: "Chemistry and Industry," October 24, 1959, pages 1349—1350.

Fischer et al.: "Chem. Ber. Deut.," volume 92, No. 11, November 10, 1959, pages 2995–2998.

Manuel et al.: "Journal of the American Chemical Society," volume 82, No. 2, January 20, 1960, pages 366–372.